United States Patent [19]

Taylor

[11] Patent Number: 4,781,574
[45] Date of Patent: Nov. 1, 1988

[54] METHOD AND SYSTEM FOR CONTROLLING CYCLONE COLLECTION EFFICIENCY AND RECYCLE RATE IN FLUIDIZED BED REACTORS

[75] Inventor: Thomas E. Taylor, Bergenfield, N.J.

[73] Assignee: Foster Wheeler Development Corporation, Livingston, N.J.

[21] Appl. No.: 47,943

[22] Filed: May 8, 1987

[51] Int. Cl.[4] .............................................. F23D 19/00
[52] U.S. Cl. ........................................ 431/7; 431/170; 110/263; 110/266; 110/347
[58] Field of Search .................... 431/7, 170; 122/4 D; 110/263, 266, 243, 347

[56] References Cited

U.S. PATENT DOCUMENTS

| 4,103,646 | 8/1978 | Yerushalmi et al. | 122/4 D |
| 4,419,965 | 12/1983 | Garcia-Mallol et al. | 431/170 |
| 4,453,497 | 6/1984 | Davis | 110/263 |
| 4,548,138 | 10/1985 | Korenberg | 110/263 |
| 4,579,070 | 4/1981 | Lin et al. | 431/7 |

Primary Examiner—Carroll B. Dority, Jr.
Attorney, Agent, or Firm—Marvin A. Naigur; Warren B. Kice

[57] ABSTRACT

A method and system for controlling the cyclone collection efficiency and recycle rate in a fluidized bed reactor in which air is introduced into the cyclone separator in a direction opposite to that of the flow of the flue gases and entrained solids. The air entrains a portion of the fine solids and passes same through the separator and to a heat recovery area to reduce the solid inventory reduction as needed.

7 Claims, 1 Drawing Sheet

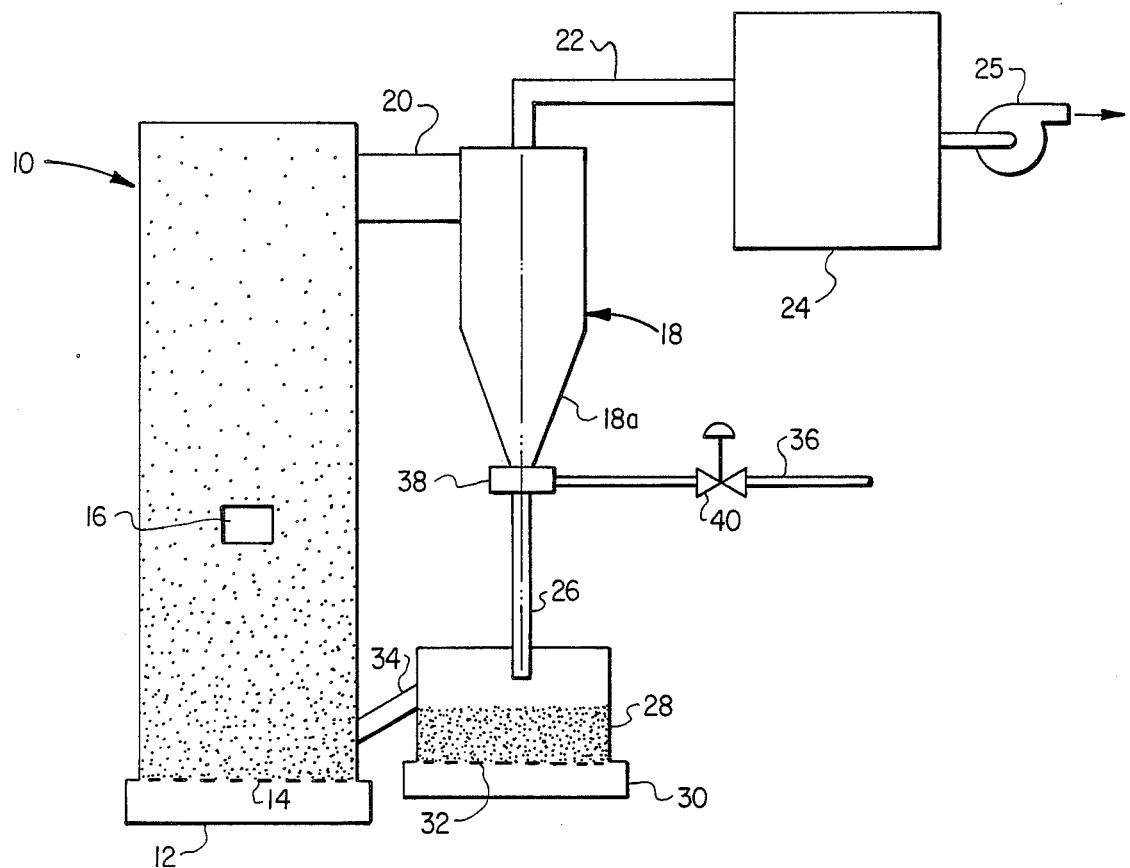

4,781,574

METHOD AND SYSTEM FOR CONTROLLING CYCLONE COLLECTION EFFICIENCY AND RECYCLE RATE IN FLUIDIZED BED REACTORS

BACKGROUND OF THE INVENTION

This invention relates to a fluidized bed reactor and, more particularly, to a method and system for controlling the cyclone collection efficiency and recycle rate in a fluidized bed reactor.

Fluidized bed reactors, such as gasifiers, steam generators, combustors, and the like, are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. The entrained particulate solids are separated externally of the bed and recycled back into the bed. The heat produced by the fluidized bed is utilized in various applications which results in an attractive combination of high heat release, high sulfur absorption, low nitrogen oxides emissions and fuel flexibility.

The most typical fluidized bed reactor is commonly referred to as a "bubbling" fluidized bed in which the bed of particulate material has a relatively high density and a well-defined, or discrete, upper surface.

In an effort to extend the improvements in combustion efficiency, pollutant emissions control, and operation turndown afforded by the bubbling bed, a fluidized bed reactor has been developed utilizing a "circulating" fluidized bed process. According to this process, the fluidized bed density is well below that of a typical bubbling fluidized bed, the air velocity is greater than that of a bubbling bed and the flue gases passing through the bed entrain a substantial amount of particulate solids and are substantially saturated therewith.

Also, the circulating fluidized bed is characterized by relatively high solids recycling which makes it insensitive to fuel heat release patterns, thus minimizing temperature variations, and therefore decreasing the nitrogen oxides formation. Also, the high solids recycling improves the efficiency of the mechanical device used to separate the gas from the solids for solids recycle. The resulting increase in sulfur adsorbent and fuel residence times reduces the adsorbent and fuel consumption.

Most of the circulating bed designs currently being utilized control load by regulating the solids recycle rate and some approach this by reducing the solids inventory from the seal pot, i.e. from the sealing system located between the outlet of the external separating devices and the recycle inlet to the fluidized bed. However, this normally has to be accomplished with a metering cooler, such as a water cooled screw, which adds mechanical complexity and costs penalties in addition to requiring downstream handling equipment.

SUMMARY OF THE INVENTION

It is therefore an object of the present invention to provide a method and system for controlling the cyclone collection efficiency and the recycle rate in a fluidized bed system.

It is a further object of the present invention to provide a method and system of the above type in which a metering device and downstream handling equipment is avoided.

It is still further object of the present invention to provide a system and method of the above type in which solids inventory control is accomplished internal to the fluidized bed system.

Toward the fulfillment of these and other objects, air is introduced into the cyclone separator in a direction opposite to that of the flow of the flue gases and entrained solids. The air entrains a portion of the fine solids in the separator and passes same to a heat recovery area to reduce the solids inventory as needed.

BRIEF DESCRIPTION OF THE DRAWINGS

The above brief description as well as further objects, features and advantages of the method of the present invention will be more fully appreciated by reference to the following detailed description of presently preferred but nonetheless illustrative embodiments in accordance with the present invention when taken in conjunction with the accompanying drawing which is a schematic representation depicting the system of the present invention.

DESCRIPTION OF THE PREFERRED EMBODIMENT

Referring specifically to the drawing, the reference numeral 10 refers, in general, to a fluidized bed reactor vessel which has an air plenum 12 disposed at its lower end portion for receiving air from an internal source. A perforated plate, or grate, 14 is provided at the interface between the lower end of the vessel 10 and the air plenum 12 for allowing the pressurized air from the plenum to pass upwardly through the vessel 10. An inlet 16, or feeder, is provided through one of the sidewalls of the vessel 10 for introducing a particulate material into the bed which can include relatively fine particles of coal and an adsorbent material, such as limestone, for adsorbing the sulfur generated during the combustion of the coal, in a known manner. The air from the plenum 12 fluidizes the particulate material in the vessel 10 in a manner to be described in detail later.

A cyclone separator 18 is provided adjacent the vessel 10 and is connected thereto by a duct 20 which extends from an opening formed in the upper portion of the vessel rear wall to an inlet opening formed in the upper portion of the separator 18. The separator 18 receives the flue gases and entrained particulate material from the fluidized bed in the vessel 10 and operates in a conventional manner to disengage the particulate material from the flue gases due to the centrifugal forces created in the separator. The separated flue gases pass, via a duct 22, into a heat recovery area shown in general by the reference numeral 24 under the action of an induced draft fan 25 connected to the downstream end of the heat recovery area. The separated solids from the separator 18 pass into a dipleg 26 connected to the outlet of the separator. The dipleg 26 extends into a relatively small vessel 28 which has an air plenum 32 disposed at its lower end portion to introduced air received from an external source through a grate 32 and into the interior of the vessel 28. A duct 34 connects the vessel 28 to the vessel 10 so that the particulate material from the vessel 28 passes into the interior of the vessel 10 and into the fluidized bed formed therein.

A pipe 36 for receiving flue gas, or air, is connected to an inlet manifold 38 which extends between the dipleg 26 and the outlet opening provided in the hopper portion 18a of the separator 18. Since the separator 18 operates under a partial vacuum due to the action of the induced draft fan 25, ambient air, or flue gas from a point downstream of the latter fan, will be drawn into the separator through the pipe 36. A valve 40 is provided in tee pipe 36 for controlling the flow rate of the gas or air passing into the manifold 38.

In operation, particulate fuel material from the inlet 16 is introduced into the vessel 10 and adsorbent material can also be introduced in a similar manner, as needed. Pressurized air from an external source passes into and through the air plenum 12, through the grate 14 and into the particulate material in the vessel 10 to fluidize the material.

A lightoff burner (not shown), or the like, is disposed in the vessel 10 and is fired to ignite the particulate fuel material. When the temperature of the material reaches a relatively high level, additional fuel from the inlet 16 is discharged into the vessel 10.

The material in the vessel 10 is self combusting by the heat in the vessel and the mixture of air and gaseous products of combustion (hereinafter referred to as "flue gases") pass upwardly through the vessel 10 and entrain, or elutriate, the relatively fine particulate material in the vessel. The velocity of the air introduced, via the air plenum 12, through the grate 14 and into the interior of the vessel 10 is established in accordance with the size of the particulate material in the vessel so that a circulating fluidized bed is formed in each chamber, i.e. the particulate material is fluidized to an extent that substantial entrainment or elutriation of the particulate material in the bed is achieved. Thus the flue gases passing into the upper portion of the furnace are substantially saturated with the particulate material. The saturated flue gases pass to the upper portion of the vessel and exit into the duct 20 and pass into the cyclone separator 18. In the separator 18, the solid particulate material is separated from the flue gases and the former is injected, via the dipleg 26, into the sealing vessel 28. The cleaned flue gases from the separator 18 exit, via the duct 22, to the heat recovery section 24 for further treatment.

From the sealing vessel 28 the separated solids normally pass, via the duct 34, through the rear wall of the vessel 10 and into the fluidized bed in the vessel where they mix with the other solids in the vessel and are treated in the manner discussed above. Air is injected, via the plenum 30 and the grate 32, to slightly fluidize the particulate material in the vessel 28 and thus seal against a backflow of flue gases from the vessel 10 through the conduit 34 and into the separator 18 in a direction opposite from the normal system flow described above.

According to a main feature of the present invention, pressured air from an external source or flue gases from the heat recovery area 24 pass through the pipe 36 and into the manifold 38 under the control of the valve 40. The air or flue gases pass from the manifold 38 upwardly into the interior of the separator 18 and interfere with the operation of same and thus reduce the amount of separation of the solids from the flue gases received from the duct 20. In addition, the air or flue gases entering the separator 18 enables a portion of the solid particulate material in the separator to be reentrained in the flue gases entering the separator 18, via the duct 20 and pass through the duct 22 and into the heat recovery area 24. Thus, by varying the opening of the valve 40, the solids injection into the vessel 10 from the separator 18 can be proportionally controlled as needed to regulate the recycle rate according to the particular load desired. This enables the load of the reactor to be varied without the use of expensive complex metering devices and downstream handling equipment and thus considerably reduces the costs of the system.

It is understood that the foregoing description relates to a balanced draft system but that a forced draft operation could be utilized by pressurizing the air or gases entering the pipe 36. Also, rather than operating the valve 40 by proportional control as discussed above, the valve can be controlled by snap action, i.e. an on-off action, in a conventional manner.

Other modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A fluidized bed combustion system comprising a vessel, means for establishing a bed of particulate material including fuel in said vessel, means for introducing air to said bed of particulate material at a velocity sufficient to fluidize said particulate material, passage means connecting said vessel to an end portion of a cyclone separating means for receiving a mixture of flue gases and entrained particulate material from said fluidized bed and separating said entrained particulate material from said flue gases, a heat recovery unit disposed externally of said vessel for treating said separated flue gases, means for passing said separated flue gases to said heat recovery unit, induced draft means for withdrawing flue gases from said heat recovery unit, means for passing said separated particulate material from an end portion of said cyclone separating means opposite said first end portion back into said fluidized bed, and means for introducing additional gas to said separating means in a direction opposite the flow of particulate material passing from said separating means and at a velocity sufficient to entrain at least a portion of said particulate material in said separating means and pass said particulate material to said heat recovery unit and thus reduce the amount of separated particulate material passed back to said fluidized bed.

2. The system of claim 1 wherein said air introducing means introduces fluidizing air to said fluidized bed at a velocity sufficient to form a circulating fluidized bed.

3. The system of claim 1 wherein said means for passing said separated particulate material back to said fluidized bed comprises an additional vessel for receiving said separated particulate material from said separating means, means for introducing air into said additional vessel to fluidize said separated particulate material, and a pipe connecting said additional vessel to said first-mentioned vessel.

4. The system of claim 3 wherein said fluidized bed in said additional vessel seals off the flow of said gases from said fluidized bed in said first-mentioned vessel into said additional vessel.

5. A method of operating a fluidized been combustion system comprising the steps of establishing a bed of particulate material, including air to said bed of particulate material at a velocity sufficient to fluidize said particulate material, discharging a mixture of flue gases and entrained particulate material from said fluidized bed into one end portion of a cyclone separator, separating said entrained particulate material from the flue gases of said mixture, passing the separated flue gases to a heat recovery unit for further treatment, passing said separated particulate material from an opposite end portion of said cyclone separator back into said fluidized bed, reducing the amount of separated particulate material passed back into said fluidized bed by introducing additional gas to said separator in a direction opposite the flow of separated particulate material from said separator to entrain a portion of said particulate material in said separator and pass it to said heat recovery unit, providing an induced draft to cause said flue gases and entrained particles to pass through said heat recovery unit.

6. The method of claim 5 further comprising the step of controlling the velocity of air introduced to said fluidized bed relative to the size of the particulate material so that said fluidized bed operates as a circulating fluidized bed.

7. The method of claim 5 further comprising the step of forming an additional fluidized bed in the path of said separated fluidized material passing from said separator to said first-mentioned fluidized bed, said additional fluidized bed being adapted to seal off the flow of said gases from said first-mentioned fluidized bed onto said separator in a direction opposite the normal direction of flow of particulate material from said additional fluidized bed to said first mentioned fluidized bed.

* * * * *